United States Patent
Snyder, II

(10) Patent No.: US 11,639,761 B2
(45) Date of Patent: May 2, 2023

(54) CONNECTOR ASSEMBLY AND METHOD

(71) Applicant: Gary Allen Snyder, II, Covington, LA (US)

(72) Inventor: Gary Allen Snyder, II, Covington, LA (US)

(73) Assignee: William von Eberstein, Madisonville, LA (US)

( * ) Notice: Subject to any disclaimer, the term of this patent is extended or adjusted under 35 U.S.C. 154(b) by 284 days.

(21) Appl. No.: 17/215,846

(22) Filed: Mar. 29, 2021

(65) Prior Publication Data

US 2021/0222808 A1  Jul. 22, 2021

Related U.S. Application Data

(62) Division of application No. 16/045,191, filed on Jul. 25, 2018, now abandoned.

(60) Provisional application No. 62/549,295, filed on Aug. 23, 2017.

(51) Int. Cl.
| | |
|---|---|
| F16L 27/08 | (2006.01) |
| F16L 15/08 | (2006.01) |
| E21B 17/043 | (2006.01) |
| B29C 65/56 | (2006.01) |

(52) U.S. Cl.
CPC .......... *F16L 27/0828* (2013.01); *B29C 65/56* (2013.01); *E21B 17/043* (2013.01); *F16L 15/08* (2013.01)

(58) Field of Classification Search
CPC ...... E21B 17/043; E21B 17/046; E21B 19/16; F16L 27/0828; F16L 37/088; F16L 21/80; F16L 15/08; F16L 19/005; F16L 21/035; F16L 2201/40

USPC ................................................. 166/380, 386
See application file for complete search history.

(56) References Cited

U.S. PATENT DOCUMENTS

| | | | | |
|---|---|---|---|---|
| 2,296,198 | A | * | 9/1942 | Boynton ............... E21B 17/046 285/91 |
| 2,314,867 | A | * | 3/1943 | Boynton ............... E21B 17/046 285/330 |
| 2,927,804 | A | | 3/1960 | Snyder |
| 3,922,009 | A | * | 11/1975 | Giebeler ................ E21B 17/08 285/391 |

(Continued)

OTHER PUBLICATIONS

International Search Report and Written Opinion dated Nov. 9, 2018, from Applicant's counterpart International Patent Application No. PCT/US2018/47179.

(Continued)

*Primary Examiner* — Jason L Vaughan
(74) *Attorney, Agent, or Firm* — Jones Walker LLP

(57) ABSTRACT

A connector assembly for connection of two tubular members without rotation. The assembly includes the pin end of a first tubular member stabbed within the connector end of a second tubular member. A connector nut is threadedly connected or snap locked to the connector end of the second tubular member. The connector nut includes a retaining shoulder cooperating with a beveled shoulder on the pin end of the first tubular member to retain the first tubular member. The assembly includes seals to provide pressure integrity and prevent leaking. Cooperating rotational torque transfer profiles in the first and second tubular members enable operational rotation of the tubular string.

8 Claims, 10 Drawing Sheets

(56) References Cited

U.S. PATENT DOCUMENTS

| | | | | |
|---|---|---|---|---|
| 4,787,463 A | * | 11/1988 | Geller | E21B 47/13 |
| | | | | 405/184 |
| 5,417,291 A | * | 5/1995 | Leising | E21B 34/14 |
| | | | | 175/320 |
| 6,168,213 B1 | | 1/2001 | Muller | |
| 6,283,511 B1 | * | 9/2001 | Kamp | F16L 37/2445 |
| | | | | 285/391 |
| 6,893,054 B2 | * | 5/2005 | Chen | F16L 37/22 |
| | | | | 285/308 |
| 6,997,264 B2 | * | 2/2006 | Simpson | F16L 13/168 |
| | | | | 166/242.6 |
| 7,493,960 B2 | * | 2/2009 | Leising | E21B 19/22 |
| | | | | 166/242.6 |
| 9,127,517 B2 | | 9/2015 | Dupal | |
| 10,359,141 B2 | * | 7/2019 | Clements | F16L 19/005 |
| 2002/0101078 A1 | | 8/2002 | Robinson | |
| 2004/0011520 A1 | * | 1/2004 | McGarian | E21B 23/04 |
| | | | | 175/320 |
| 2004/0135370 A1 | | 7/2004 | Evans et al. | |
| 2007/0013188 A1 | * | 1/2007 | Dallas | F16L 17/08 |
| | | | | 285/354 |
| 2008/0230218 A1 | | 9/2008 | Hall et al. | |
| 2009/0114401 A1 | | 5/2009 | Purkis | |
| 2011/0147009 A1 | | 6/2011 | Dupal | |
| 2012/0049513 A1 | * | 3/2012 | Herrera | E21B 17/046 |
| | | | | 285/331 |
| 2013/0146305 A1 | | 6/2013 | Dupal | |
| 2014/0166314 A1 | | 6/2014 | Black | |
| 2015/0323109 A1 | | 11/2015 | Dupal et al. | |
| 2017/0152978 A1 | | 6/2017 | Leeth | |

OTHER PUBLICATIONS

Applicant's counterpart Parent U.S. Appl. No. 16/045,191 pending in USPTO.

* cited by examiner

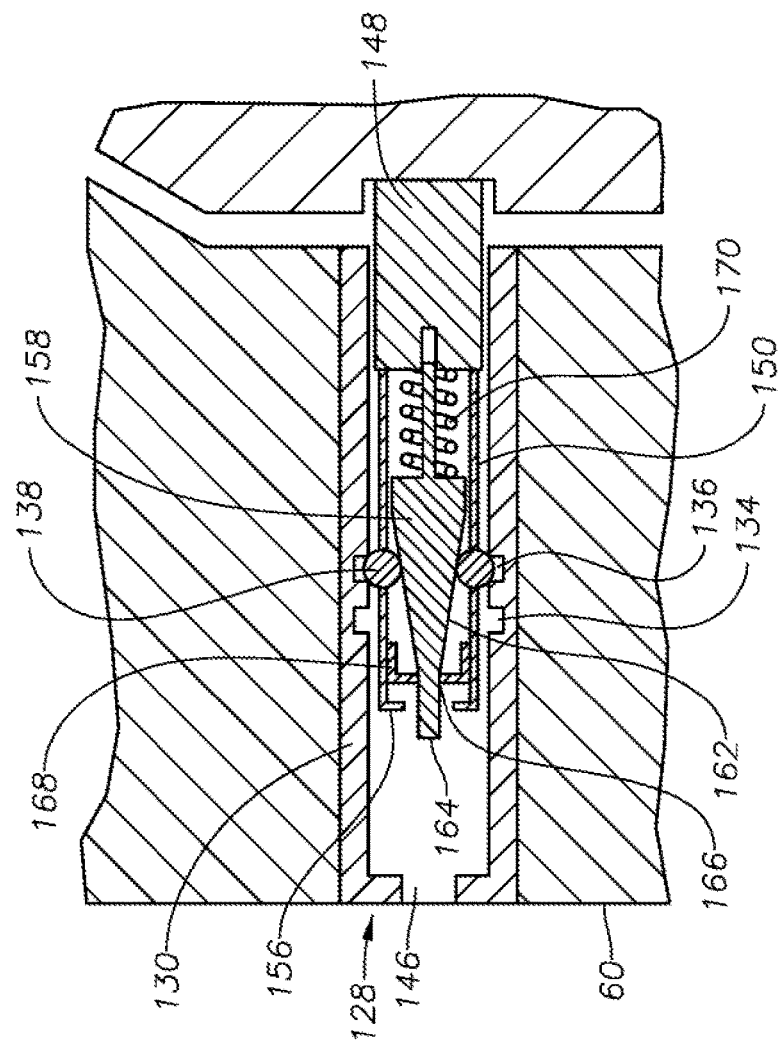
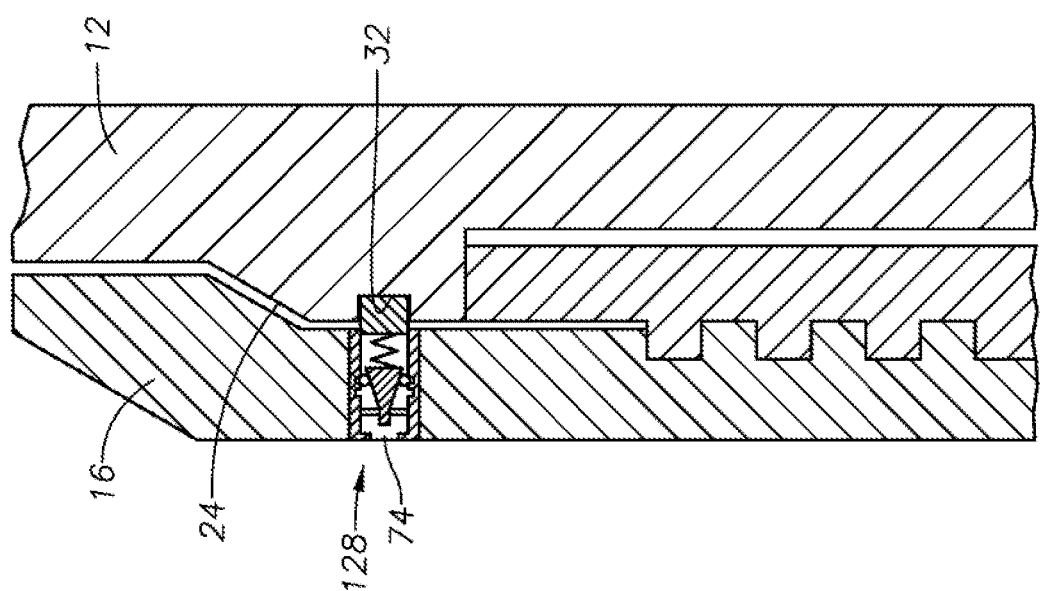
Fig. 12
Fig. 11

CONNECTOR ASSEMBLY AND METHOD

CROSS-REFERENCE TO RELATED APPLICATIONS

This application is a divisional of and claims priority to U.S. patent application Ser. No. 16/045,191, filed on Jul. 25, 2018, which claims the benefit of and priority to U.S. Provisional Patent Application No. 62/549,295, filed on Aug. 23, 2017, each of which is incorporated by reference herein.

BACKGROUND OF THE DISCLOSURE

The present invention relates to a coupling used in connection with pipelines, chiksans, plumbing, water hoses, firehoses, or any other tubular structure, and a method of using the coupling without a hammer and wing union and without requiring high make-up torque.

In the exploration and production of oil and gas, chiksan or a column of pipe (e.g., a frack and cementing iron) may be employed for a variety of purposes. On a well, the chiksan iron is made up on the rig's platform. The chiksan is rigged up onto the well bore. The chiksan iron transmits drilling fluid, cement, frack fluid, frack proppants, nitrogen, well production fluid either via pumps or natural flow when installed onto a top drive, christmas tree, a frack tree, or a blowout preventer (BOP). A fluid is pumped down through the internal bore in the chiksan, exits at or near the well head, then down the drill pipe or tubing and circulates back up the well annulus (void between the drill string and the well bore) or through perforations and into the formations. The chiksan iron may also be used to cement casing, a liner, or squeeze cement plugs downhole. The chiksan iron may also be used to work-over a hydrocarbon well. Chiksan iron can be used on wells that reach a length of 30,000 feet for a vertically drilled well and 35,000 feet for a deviated or horizontal drilled well.

The Chiksan includes a column of individual joints welded or segments of pipe threadedly connected together by threaded ends, which may create a loop. A joint or segment of pipe may vary in length. Typically, the length of a pipe joint ranges from 2 feet to 30 feet. A joint or segment of chiksan has a box member secured at one end and a pin member secured at the other end. The box member is internally threaded and adapted to receive the pin member of another tubular section, which has external threads. Mating joints of chiksan are interconnected via the threads to make up the union. The chiksan must be securely made up to prevent leakage, wobbling, or unscrewing. Typically, sledge hammers are used to transmit sufficient rotational torque to the chiksan unions to ensure that the pin end is tightly threaded in the box end; this is called make-up torque. The amount of torque required depends in part on the specific frictional properties of the threaded connections. A higher friction coefficient means increased torque transmitting ability thereby lessening instances of chiksan unions unscrewing and having to be made up again using a sledge hammer. A lower friction coefficient with less torque transmitting ability may cause too much torque to be applied when making up the union. Excessive torque could stretch or burst the box member or crack or break the pin member. This is undesired as chiksan is expensive.

Pipe "dope" may be applied to the threaded connections of the joints to maintain a high coefficient of friction. The dope permits easier breaking down of the chiksan union and helps prevent excessive make up. Despite the application of pipe dope, excessive make up and joint damage remains a problem. Moreover, the use of sledge hammers to make up chiksan unions increases operational costs as additional equipment and personnel are required. The need exists for equipment and methods to connect chiksan iron without hammering the union together into itself.

SUMMARY OF THE DISCLOSURE

It is an object of the present invention to provide a chiksan connector and method that does not require sledge hammers or hydraulic tongs or lever bars to make up the chiksan iron.

It is a further object of the present invention to provide a chiksan connector and method that eliminates the need for high torque to make up.

BRIEF DESCRIPTION OF THE DRAWINGS

FIG. 11 is a partial cross-sectional view of the holding device of the connector assembly shown as an anti-rotation assembly in an engaged position.

FIG. 12 is a cross-sectional view of the alternative embodiment of the connector assembly shown in FIG. 11 with the anti-rotation assembly.

DETAILED DESCRIPTION OF THE DISCLOSURE

Figure 1:
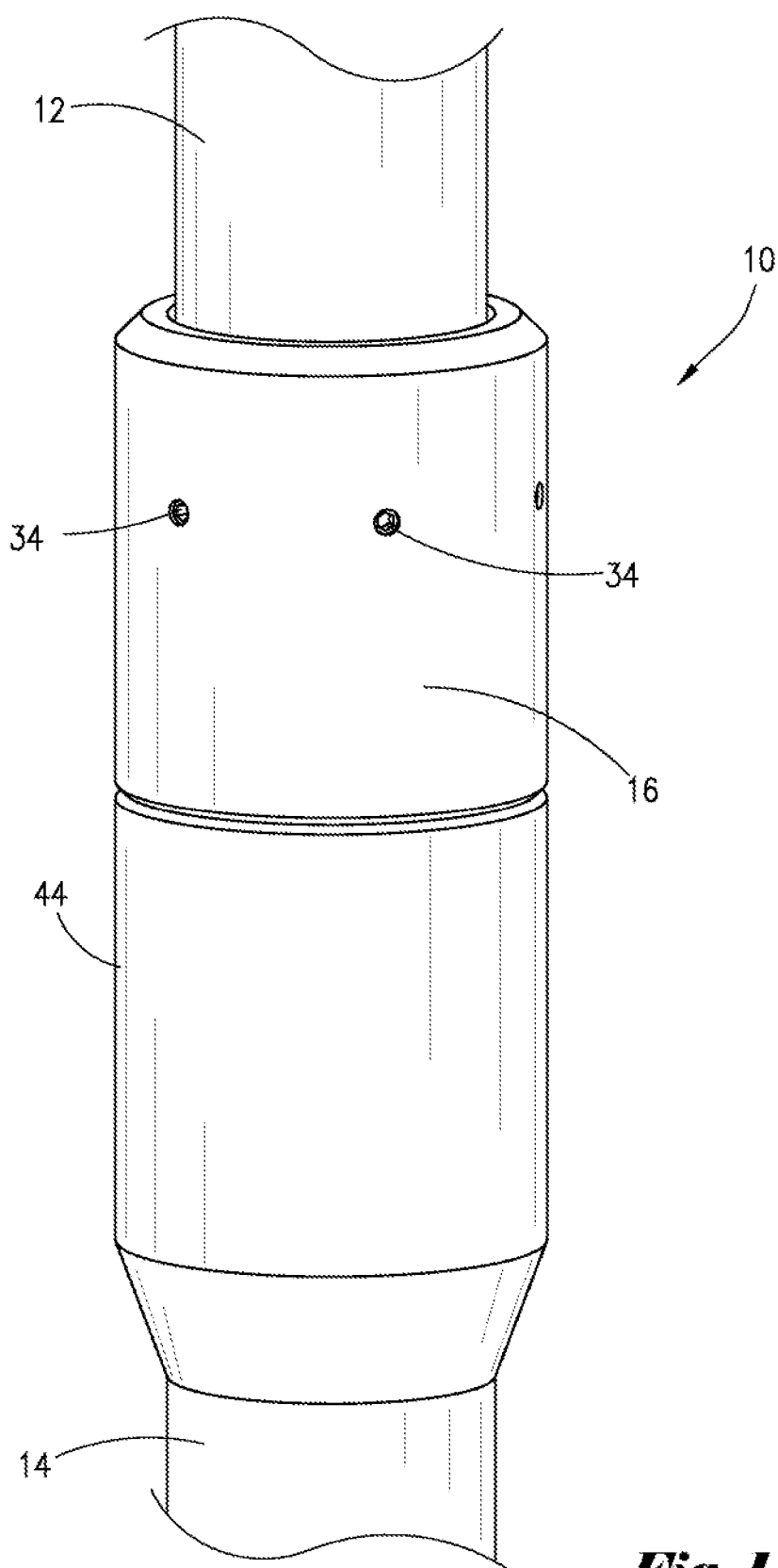
FIG. 1 is a perspective view of the connector assembly of the present invention.

With reference to the figures where like elements have been given like numerical designation to facilitate an understanding of the present disclosure, and in particular with reference to the embodiment of the present disclosure illustrated in FIG. 1, connector assembly 10 may include first tubular member 12, second tubular member 14 and connector nut 16. First and second tubular members 12 and 14 may be pipeline segments, chiksans, plumbing pipe/line segments, water hose segments, firehose segments, or any other tubular segments.

Figure 2:
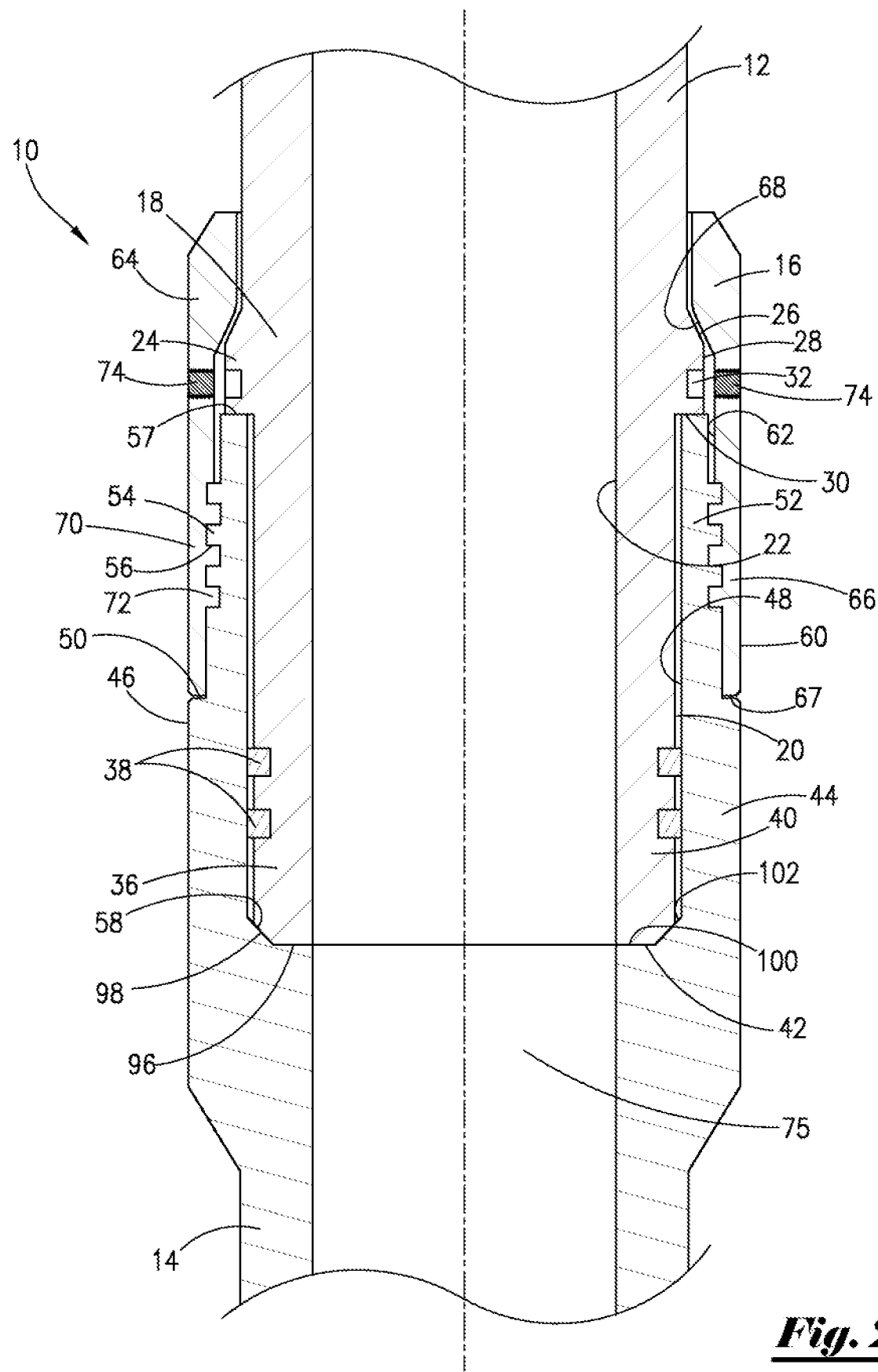
FIG. 2 is a cross-sectional view of the connector assembly of FIG. 1.

FIG. 2 shows that first tubular member 12 may include pin end 18. Pin end 18 may include outer surface 20 and inner surface 22. Outer surface 20 of pin end 18 may include beveled shoulder 24. Shoulder 24 may include retaining face 26, holding face 28, and stop face 30. Shoulder 24 may also include one or more recesses 32 in holding face 28 for receiving a holding device 34 (not shown). Lower section 36 of pin end 18 may have one or more seals 38 positioned in outer surface 20. Seals 38 may be pressure seals formed of rubber, urethane, steel, plastic or other material capable of forming a seal that is leak resistant. Lower section 36 may include distal end 40. Distal end 40 may have torque transfer profile 42. Profile 42 may include lateral surface 96 and tapered surface 98.

With reference to FIG. 2, second tubular member 14 may have connector end 44. Connector end 44 may have outer surface 46 and inner surface 48. Outer surface 46 may contain shoulder 50. Connector end 44 may also include upper section 52. Outer surface 46 of upper section 52 may include connector nut means 54. Connector nut means 54 may be any device capable of detachably affixing connector nut 16 to upper section 52 of connector end 44 of second tubular member 14. Connector nut means 54 may be threads 56. Upper section 52 may include support surface 57. Inner surface 48 of connector end 44 may have torque transfer profile 58. Profile 58 may include lateral surface 100 and tapered surface 102.

Again with reference to FIG. 2, connector nut 16 may be a tubular device having outer surface 60 and inner surface 62. Connector nut 16 may also include upper section 64 and lower section 66. Lower section 66 may include distal surface 67. Inner surface 62 of upper section 64 may have shoulder 68. Inner surface 62 of lower section 66 may contain connector end means 70. Connector end means 70 may be any device capable of cooperating with connector nut means 54 to detachably affix connector nut 16 to upper section 52 of connector end 44 of second tubular member 14. Connector end means 70 may be threads 72 that cooperatively engage and disengage from threads 56. Threads 72 may also threadedly engage and disengage from threads 56. Connector nut 16 may contain one or more thru holes 74. Each hole 74 may house or contain holding device 34 (not shown). Each hole 74 may align with recess 32 in holding face 28 of pin end 18 of first tubular member 12. Holding device 34 (not shown) may be positioned within aligned hole 74 and recess 32.

To make up or connect first tubular member 12 to second tubular member 14, connector nut 16 is positioned over first tubular member 12. Pin end 18 of first tubular member 12 is stabbed into connector end 44 of second tubular member 14. As understood by one skilled in the art, this may be accomplished by positioning second tubular member 14 in a slip, lifting first tubular member 12 above second tubular member 14, and then lowering pin end 18 of first tubular member 12 into connector end 44 of second tubular member 14. Stop face 30 of beveled shoulder 24 acts as a stop for pin end 18 by contacting support surface 57 of upper section 52 of second tubular member 14. Connector nut 16 is secured to upper section 52 of second tubular member 14 by rotating connector nut 16 so that connector nut 16 is threadedly connected to upper section 52 via threaded engagement of threads 56 and threads 72. Shoulder 50 of connector end 44 of second tubular member 14 acts as a stop for connector nut 16 by contacting lower section 66 of connector nut 16 at distal surface 67. The detachable affixation of connector nut 16 to second tubular member 14 compresses first tubular member 12 and second tubular member 14 together into operative connection. First tubular member 12 is operatively connected to second tubular member 14 via connector nut 16. Shoulder 68 of connector nut 16 cooperates with or engages beveled shoulder 24 of first tubular member 12, and in particular, retaining face 26 of beveled shoulder 24, to hold or maintain first tubular member 12 in position and operatively connected to second tubular member 14. The operative engagement of threads 56 and threads 72 permits the tension load to be transferred to beveled shoulder 24 of first tubular member 12. The operative connection of first and second tubular members 12, 14 forms bore 75 through which pressurized fluid (e.g., pressurized water flow) may be pumped. Seals 38 form a seal between outer surface 20 of first tubular member 12 and inner surface 48 of second tubular member 14 to maintain pressure within first and second tubular members 12, 14 and to prevent leaking of the fluid. The operative connection of first and second tubular members 12, 14 also causes operative engagement of torque transfer profile 42 of pin end 18 of first tubular member 12 and torque transfer profile 58 of connector end 44 of second tubular member 14. For example, lateral surface 96 cooperatively engages lateral surface 100 and tapered surface 98 cooperatively engages tapered surface 102. The operative engagement of torque transfer profiles 42, 58 permits rotational torque to be transferred from first tubular member 12 to second tubular member 14 through connector nut 16 (and in like fashion to any other tubular segments made up with first and second tubular members 12, 14).

Figure 3:
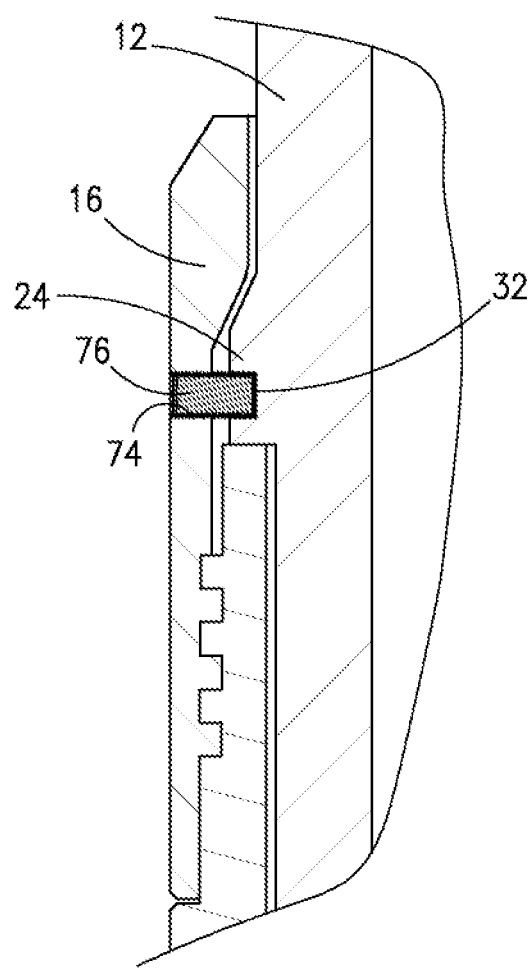
FIG. 3 is a partial cross-sectional view of the holding device of the connector assembly of the present invention shown as a set screw.

To ensure that connector nut 16 remains secured about first and second tubular members 12, 14, holding device 34 may be employed to retain connector nut 16 in a fixed or stationary position relative to first and second tubular members 12, 14. Holding device 34 ensures that connector nut 16, namely connector end means 70 or threads 72, do not detach or threadedly detach from connector nut means 54 or threads 56 of second tubular member 14 even while connector assembly 10 is rotated during operation of the tubular string incorporating connector assembly 10. Holding device 34 may be any type of device capable of maintaining connector nut 16 in fixed position about first tubular member 12. One or more holding devices 34 may be used, as for example, two, three, or four holding devices 34. Preferably, holding device 34 fixedly connects connector nut 16 to beveled shoulder 24 of pin end 18 of first tubular member 12. For example, holding device 34 may be set screw 76 as shown in FIG. 3. Screw 76 may be inserted into thru hole 74 of connector nut 16 and into recess 32 of beveled shoulder 24 to thereby fixedly attach connector nut 16 to beveled shoulder 24 of first tubular member 12. Removal of screw 76 from recess 32 disengages the direct fixed connection between connector nut 16 and beveled shoulder 24 of first tubular member 12.

Figure 4:
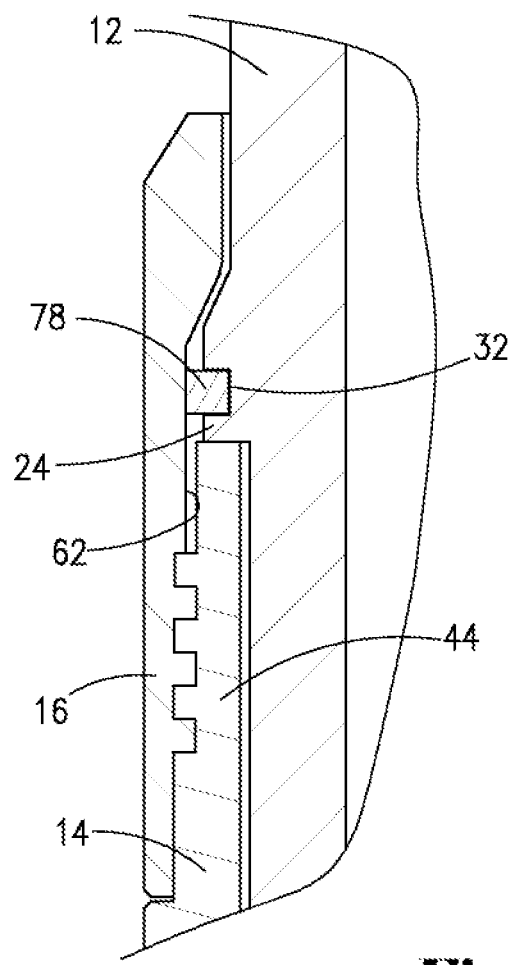
FIG. 4 is a partial cross-sectional view of the holding device of the connector assembly of the present invention shown as a snap latch.

As seen in FIG. 4, holding device 34 may also be snap latch 78. Latch 78 may be inserted into thru hole 74 and into recess 32 to affix connector nut 16 to beveled shoulder 24 of first tubular member 12. Latch 78 may also be made integral with connector nut 16 or fixed to inner surface 62 (e.g., via welding) and extend outward from inner surface 62. Latch 78 would snap into recess 32 when connector nut 16 is connected to connector end 44 of second tubular member 14 and disengage from recess 32 when connector nut 16 is detached from connector end 44 of second tubular member 14. Alternatively, holding device 34 may be anti-rotation assembly 128 as discussed in more detail in connection with FIGS. 10-13 below.

Figure 5:
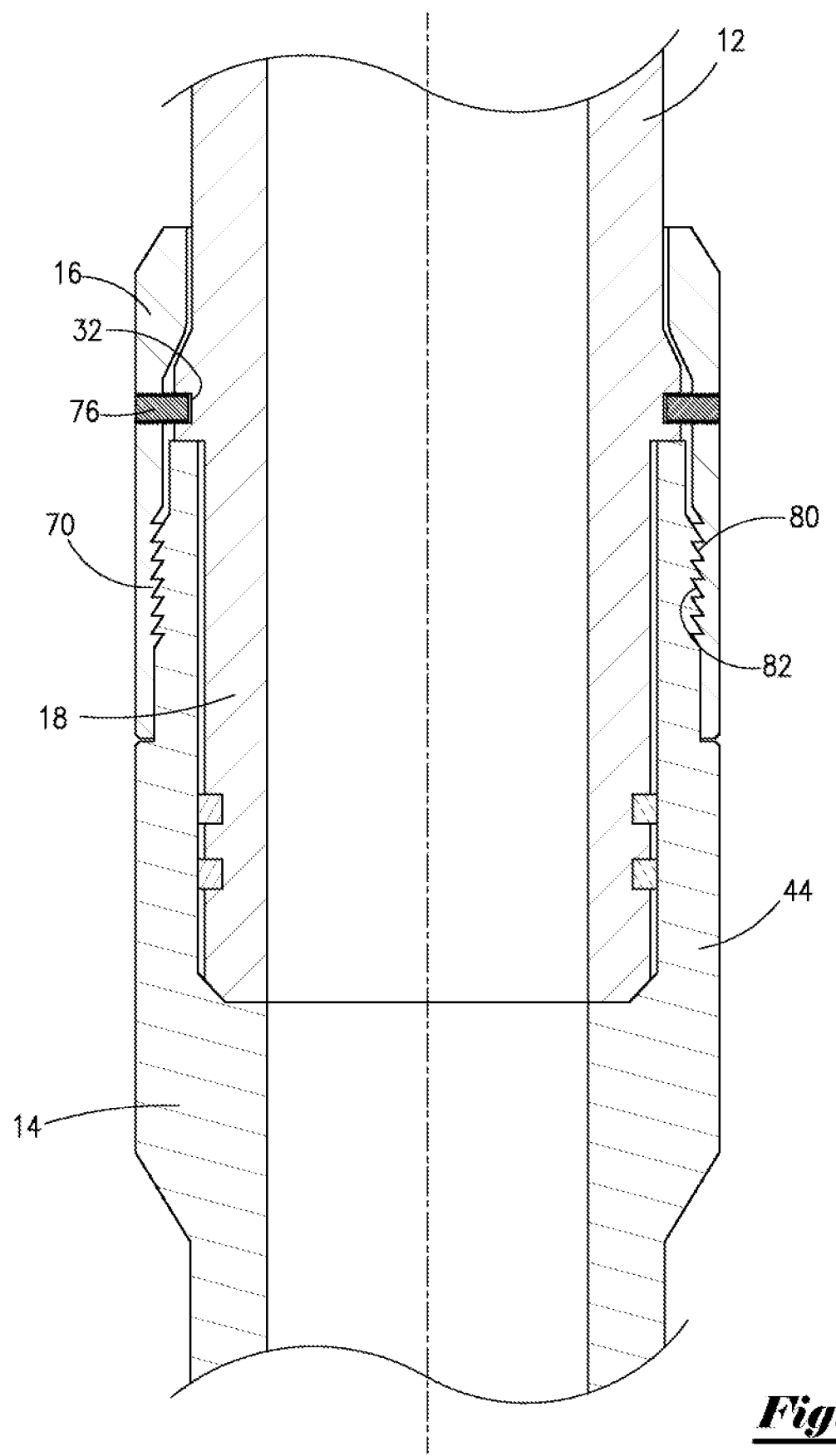
FIG. 5 is a cross-sectional view of an alternative embodiment of the connector assembly of the present invention.

FIG. 5 shows an alternative embodiment of connector assembly 10. Connector nut means 54 of second tubular member 14 are formed as wicker-type threads 80. Connector end means 70 of connector nut 16 are formed as wicker-type threads 82. Rather than threadedly connecting connector nut 16 to connector end 44 of second tubular member 14, in the alternative embodiment of assembly 10, wicker-type threads 82 of connector nut 16 and wicker-type threads 80 of second tubular member 14 operatively engage when pin end 18 of first tubular member 12 is stabbed into connector end 44 of second tubular member 14 to thereby make up first and second tubular members 12, 14. Connector nut 16 may be disengaged from connector end 44 of second tubular member 14 by rotating connector nut 16 of wicker-type threads 80 of second tubular member 14. Alternative assembly 10 may include or not include one or more holding devices 34. If one or more holding devices 34 are included with alternative assembly 10, one or more holding devices 34 may be set screw 76, snap latch 78, or anti-rotation assembly 128 (as shown in FIGS. 10-13) to prevent connector nut 16 from rotating off and disengaging from second tubular member 14 during rotation of alternative assembly 10 as may occur. FIG. 5 shows assembly 10 with set screws 76. In this embodiment, holding device 34 may be employed to lock connector nut 16 in a fixed position relative to first tubular member 12 before first tubular member 12 is connected to second tubular member 14.

Figure 6:
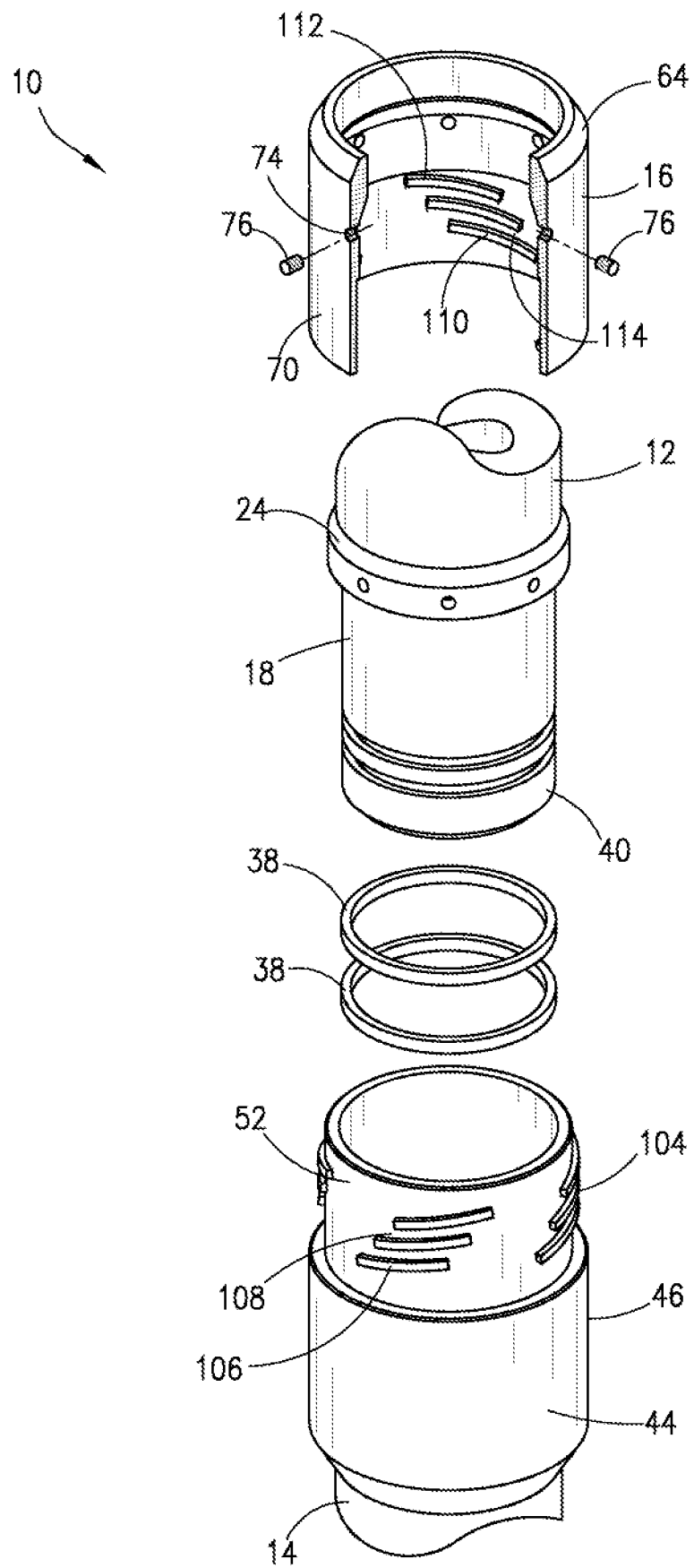
FIG. 6 is an exploded, partial cut-away, perspective view of a further alternative embodiment of the connector assembly of the present invention.

FIG. 6 reveals a further alternative assembly 10. In the further alternative assembly 10, connector nut means 54 of second tubular member 14 are formed as breech lock-type threads 104. Breech lock-type threads 104 are interrupted helically threads that contain thread-sections 106 and gaps 108. Connector end means 70 of connector nut 16 are formed as breech lock-type threads 110. Breech lock-type threads 110 are interrupted helically threads that contain thread-sections 112 and gaps 114. Connector nut 16 is connected to connector end 44 of second tubular member 14 by positioning each of thread-sections 112 of connector nut 16 within respective gaps 108 of second tubular member 14 and rotating connector nut 16 in a first direction by a ½ turn causing mating engagement of each thread-section 106 of second tubular member 14 with a corresponding thread-section 112 of connector nut 16. Thus, first tubular member 12 (operatively engaged within connector nut 16) and second tubular member 14 are made up. Tubular members 12, 14 may be disengaged by rotating connector nut 16 in the opposite direction by a ½ turn and removing connector nut 16 (and associated tubular member 12) from connector end 44 of second tubular member 14. If one or more holding devices 34 are included with further alternative assembly 10, one or more holding devices 34 may be set screw 76, snap latch 78, or anti-rotation assembly 128 to prevent connector nut 16 from rotating off and disengaging from second tubular member 14 during rotation of further alternative assembly 10 as may occur. FIG. 6 shows assembly 10 with set screws 76.

Figure 7:
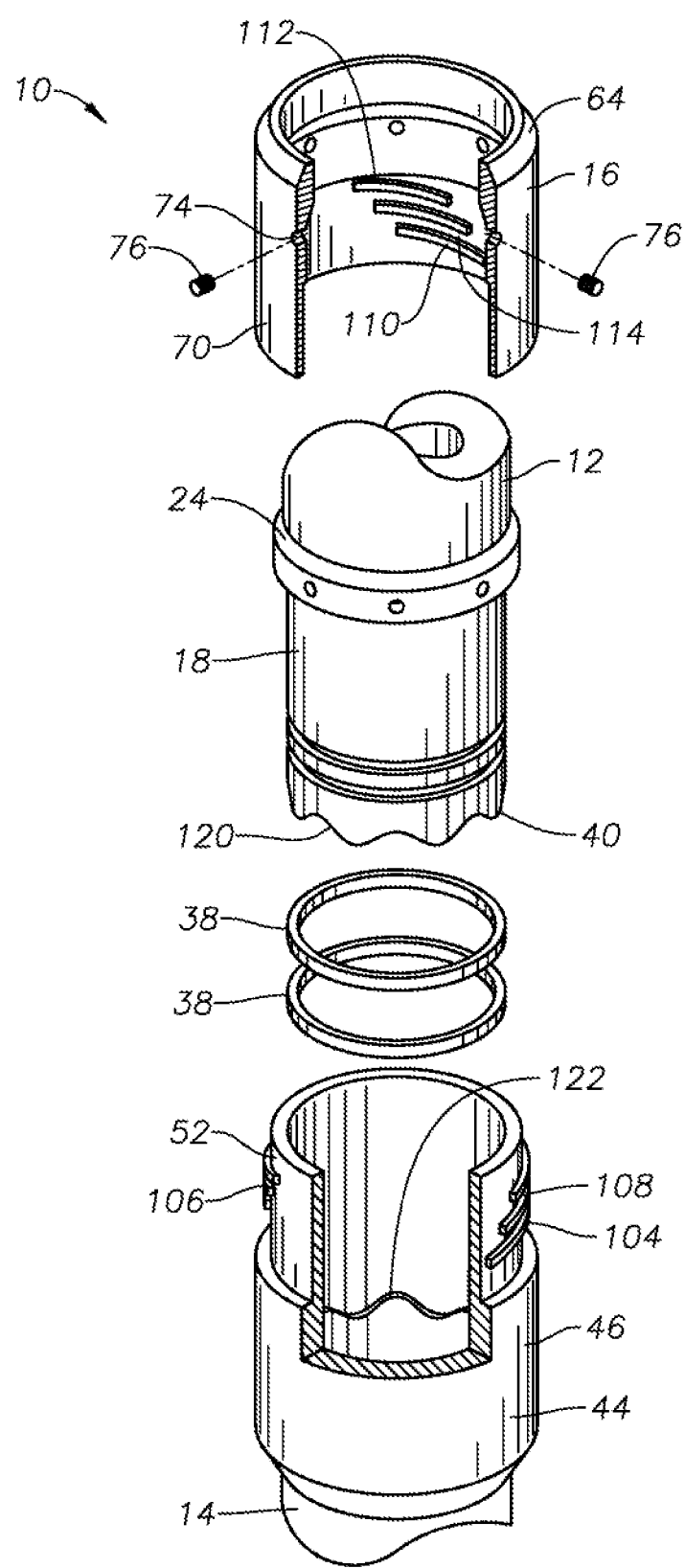
FIG. 7 is an exploded, partial cut-away, perspective view of an alternative embodiment of the connector assembly having wave-shaped surfaces.

FIG. 7 shows an alternative embodiment of connector assembly 10. In this alternative, torque transfer profile 42 of first tubular member 12 may include wave-shaped surface 120, and torque transfer profile 58 of second tubular member 14 may include wave-shaped surface 122. The operative connection of first and second tubular members 12, 14 may cause reciprocal engagement of wave-shaped surface 120 of pin end 18 of first tubular member 12 and wave-shaped surface 122 of connector end 44 of second tubular member 14. The reciprocal engagement of wave-shaped surfaces 120 and 122 permits rotational torque to be transferred from first tubular member 12 to second tubular member 14.

Figure 8:
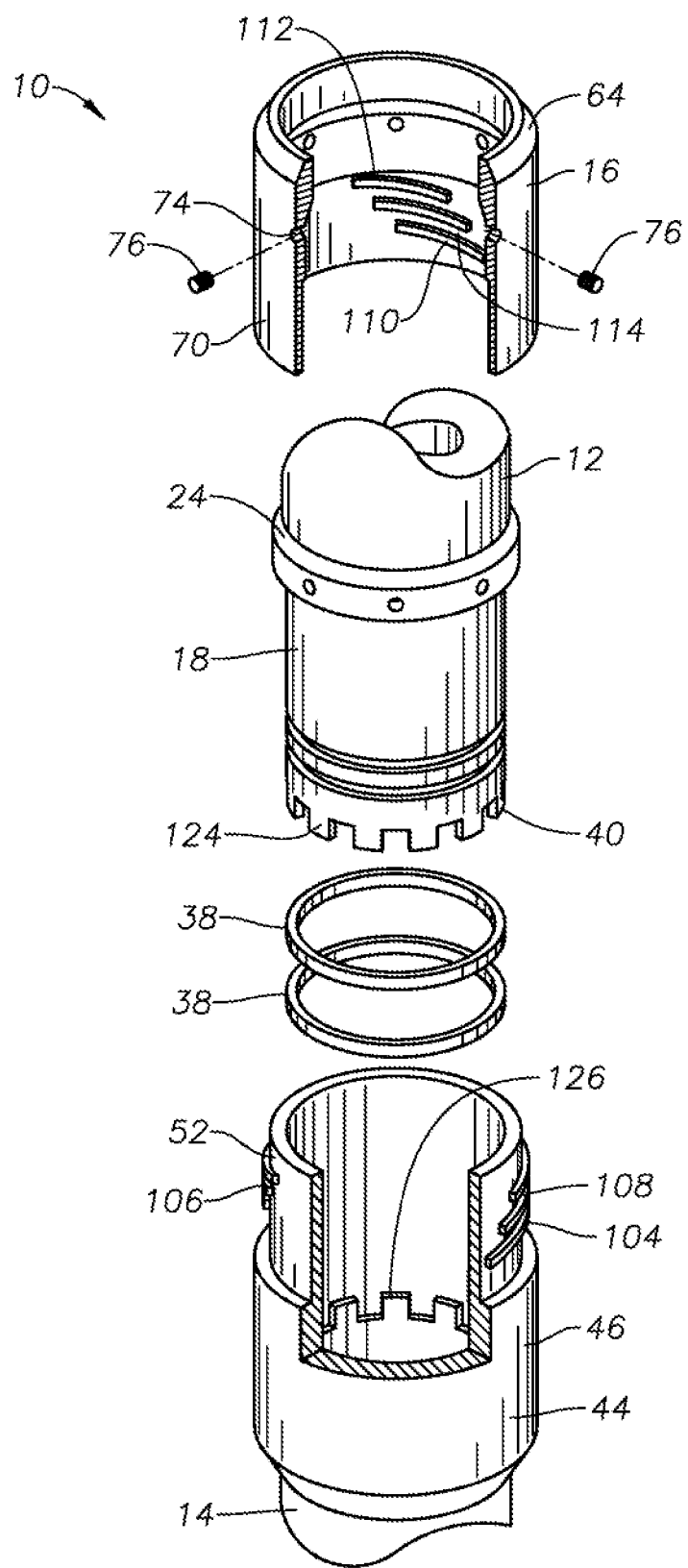
FIG. 8 is an exploded, partial cut-away, perspective view of an alternative embodiment of the connector assembly having castle-shaped surfaces.

FIG. 8 shows another alternative embodiment of connector assembly 10. In this alternative, torque transfer profile 42 may include castle-shaped surface 124, and torque transfer profile 58 of second tubular member 14 may include castle-shaped surface 126. In this alternative, the operative connection of first and second tubular members 12, 14 may cause reciprocal engagement of castle-shaped surface 124 of pin end 18 of first tubular member 12 and castle-shaped surface 126 of connector end 44 of second tubular member 14. The reciprocal engagement of castle-shaped surfaces 124 and 126 permits rotational torque to be transferred from first tubular member 12 to second tubular member 14.

In the alternatives shown in FIGS. 7 and 8, connector nut means 54 of second tubular member 14 may be any device capable of detachably affixing connector nut 16 to upper section 52 of connector end 44 of second tubular member 14, while connector end means 70 may be any device capable of cooperating with connector nut means 54 to detachably affix connector nut 16 to connector end 44 of second tubular member 14. For example, connector nut means 54 and connector end means 70 may be threads 56 and 72, wicker-type threads 80 and 82, or breech lock-type threads 104 and 110. In FIGS. 7 and 8, connector nut means 54 and connector end means 70 are shown as breech lock-type threads 104 and 110.

Figure 10:
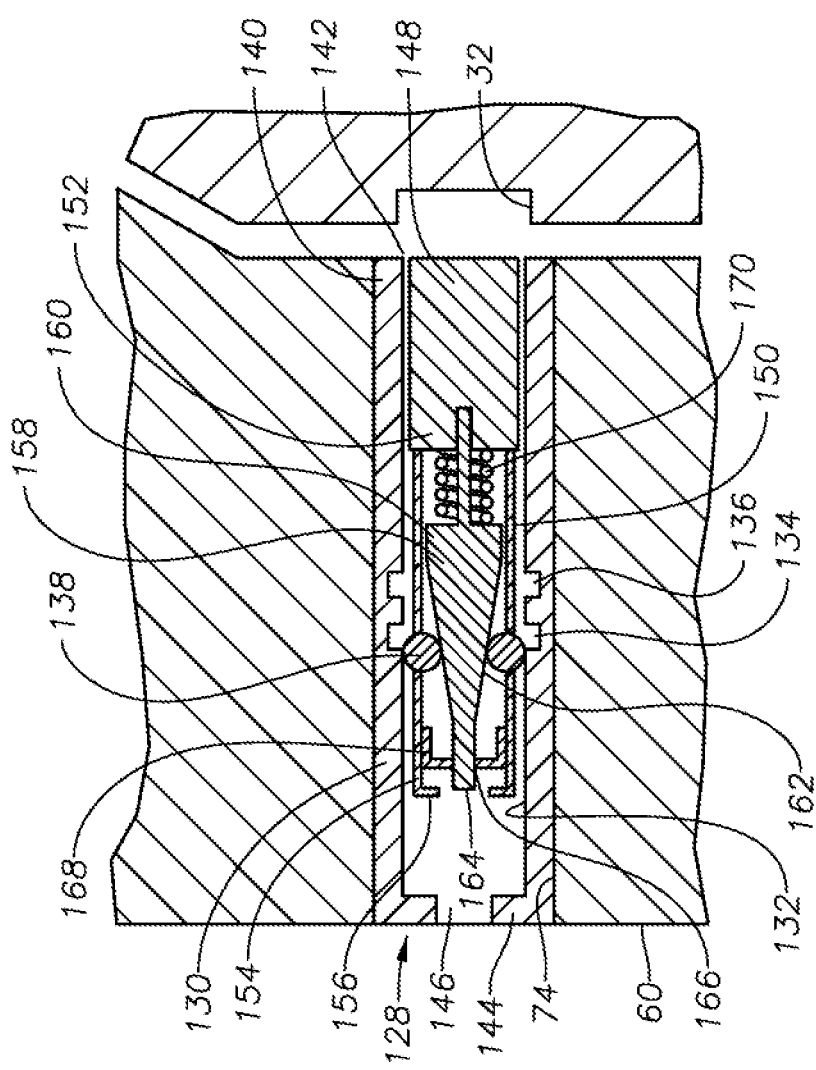
FIG. 10 is a cross-sectional view of the alternative embodiment of the connector assembly shown in FIG. 9 with the anti-rotation assembly.
Figure 9:
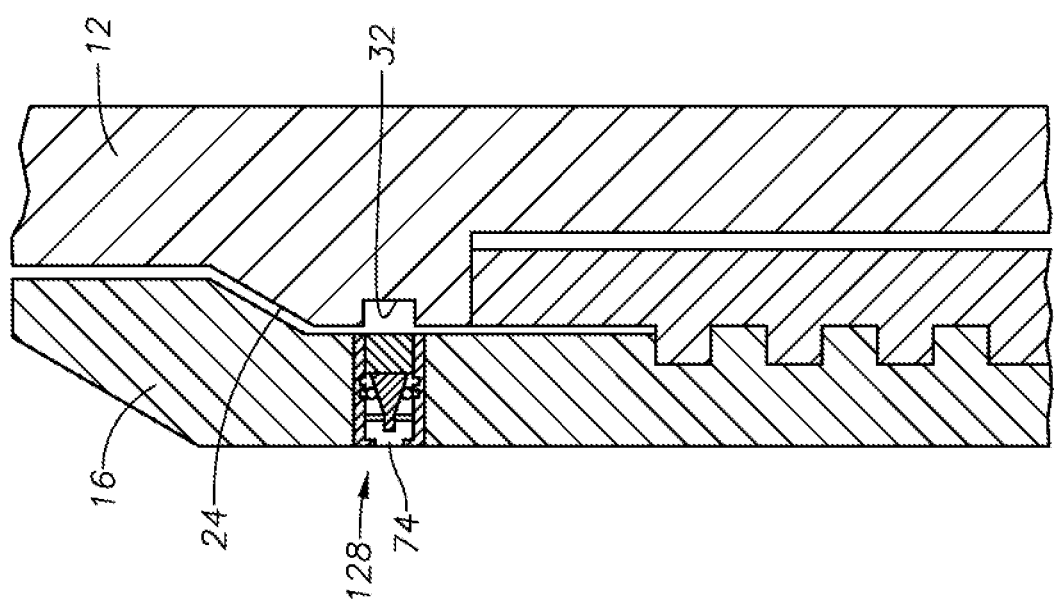
FIG. 9 is a partial cross-sectional view of the holding device of the connector assembly shown as an anti-rotation assembly in a neutral position.

FIG. 9 shows a partial view of yet another alternative embodiment of connector assembly 10 in which holding device 34 may be anti-rotation assembly 128. Anti-rotation assembly 128 may be disposed within thru hole 74 in connector nut 16. As shown in FIG. 10, anti-rotation assembly 128 may include body 130 having inner surface 132 with a set of outer bearing cavities 134 and a set of inner bearing cavities 136. Outer and inner bearing cavities 134, 136 may be adapted to selectively engage a set of bearings 138. The number of outer and inner bearing cavities 134, 136 may be equal to the number of bearings 138. Anti-rotation assembly 128 may include any number of bearings 138. In preferred embodiments, anti-rotation assembly 128 may include two or three bearings 138. Body 130 may also have proximal end 140 with proximal opening 142 and distal end 144 with distal opening 146.

Referring still to FIG. 10, stopper 148 may be disposed within body 130 adjacent to proximal opening 142. Support member 150 may extend from distal end 152 of stopper 148. Distal end 154 of support member 150 may have one or more protuberances 156. Plug 158 may be disposed within support member 150. Plug 158 may have proximal end 160, tapered outer surface 162, and distal neck 164. Distal neck 164 may be slidingly disposed through aperture 166 in guide 168 of support member 150 which may be positioned within distal end 154. Guide 168 may be fixedly attached within distal end 154 of support member 150. Alternatively, guide 168 may be an integral part of distal end 154 of support member 150. Tapered outer surface 162 may selectively force bearings 138 into outer or inner bearing cavities 134 or 136. Spring 170 may be disposed between proximal end 160 of plug 158 and distal end 152 of stopper 148. Connector assembly 10 may include two or more anti-rotation assemblies 128 in each thru hole 74.

FIG. 10 illustrates anti-rotation assembly 128 in a neutral position. In the neutral position, tapered outer surface 162 of plug 158 may secure bearings 138 in engagement with outer bearing cavities 134 such that stopper 148 is disposed entirely within proximal end 140 of body 130.

FIGS. 11 and 12 illustrate anti-rotation assembly 128 in the engaged position in which stopper 148 engages recess 32 of first tubular member 12. In this position, anti-rotation assembly 128 fixedly connects connector nut 16 to beveled shoulder 24 of pin end 18 of first tubular member 12. Tool 180 (shown in FIG. 13) may be used to move anti-rotation assembly 128 between the neutral position shown in FIG. 10 and the engaged position shown in FIG. 12.

Figure 13:
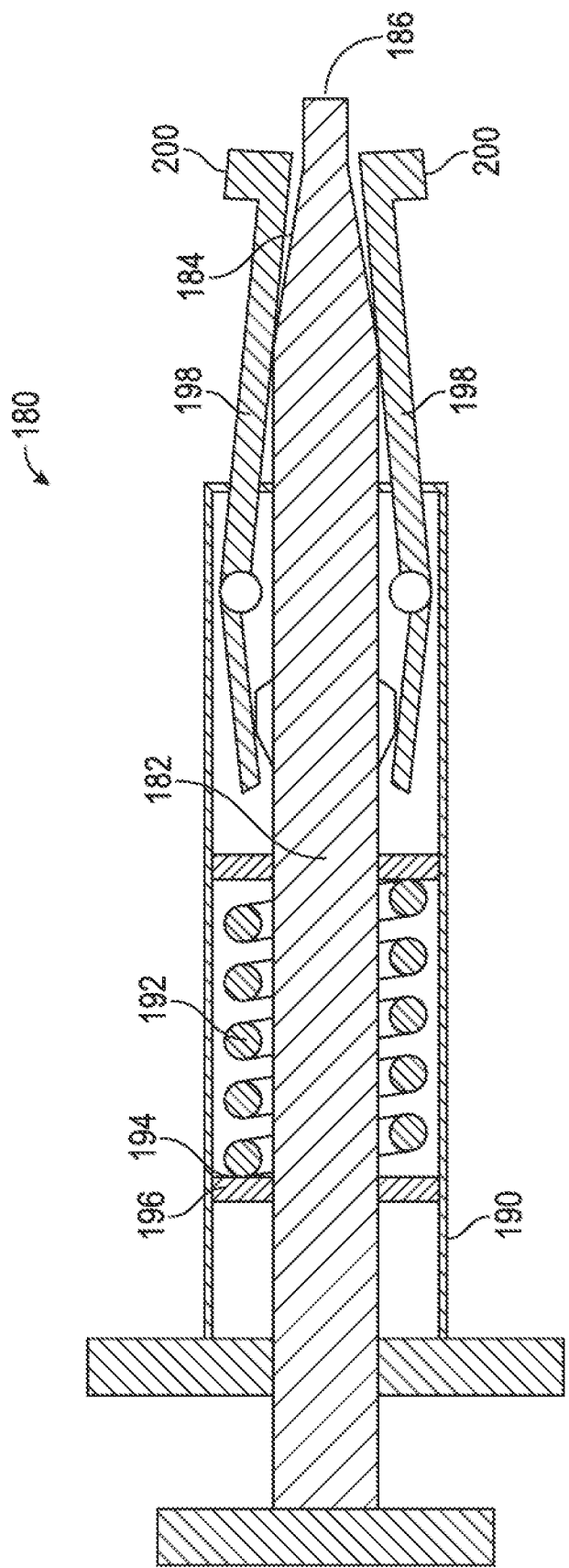
FIG. 13 is a plan view of a tool for the anti-rotation assembly.

Referring now to FIG. 13, tool 180 may include central member 182 having tapered outer surface 184 leading to compression tip 186 at a distal end of tool 180. Central member 182 may be disposed within housing 190. Spring 192 may also be disposed within housing 190 around central member 182. Distal end 194 of spring 192 may be operatively connected to central member 182, such as through connection member 196. Connection member 196 may be a ring disposed around central member 182, a radial extension from central member 182, or any other mechanism for connecting distal end 194 of spring 192 to a fixed point on central member 182. Tool 180 may further include arms 198 extending from within housing 190 and positioned around central member 182. Each arm 198 may include extension 200 at its distal end. Tool 180 may include two or more arms 198 positioned around central member 182.

With reference to FIGS. 10, 12, and 13, compression tip 186 of central member 182 and extensions 200 of each arm 198 of tool 180 may be inserted through distal opening 146 of body 130 and past protuberances 156. Compression tip 186 of central member 182 may engage distal neck 164 of plug 158. Selectively applying force to tool 180 may cause compression tip 186 to cause distal neck 164 to slide forward through aperture 166 in guide 168 until extensions 200 of arms 198 engage an outer surface of guide 168. This will compress spring 170. The displacement of plug 158 may release bearings 138 from outer bearing cavities 134 thereby allowing the displacement of support member 150 within body 130. By further selectively applying force to tool 180, extensions 200 of arms 198 may cause support member 150 to be projected forward such that stopper 148 engages recess 32 of first tubular member 12. Withdrawing tool 180 from body 130 may allow spring 170 to push plug 158 such that distal neck 164 is again disposed through aperture 166. As plug 158 travels backward, tapered outer surface 162 may force bearings 138 into engagement with inner bearing cavities 136 such that anti-rotation assembly 128 is locked in the engaged position as shown in FIG. 12.

Tool 180 may also be used to return anti-rotation assembly 128 to the neutral position shown in FIG. 10. In the same way, compression tip 186 of central member 182 and extensions 200 of arms 198 may be inserted to displace plug 158 forward and compress spring 170. Bearings 138 may be released from inner bearing cavities 136 by the displacement of plug 158. A user may apply additional force to central member 182 such that compression tip 186 extends further beyond extensions 200 of arms 198. As central member 182 slides through arms 198, spring 192 may be compressed and tapered outer surface 184 of central member 182 may force extensions 200 of arms 198 radially outward such that extensions 200 may engage an inner surface of protuberances 156. A user may then pull tool 180 outwardly such that extensions 200 apply backward force to protuberances 156 thereby pulling support member 150 backward and stopper 148 out of engagement with recess 32 of first tubular member 12. The user may then release the additional force from central member 182 such that spring 192 pulls central member 182 back to its initial position allowing extensions 200 to retract and again fit through the opening between protuberances 156. After releasing protuberances 156 and distal neck 164 of plug 158, spring 170 may push plug 158 backward such that tapered outer surface 162 forces bearings 138 into engagement with outer bearing cavities 134 and anti-rotation assembly 128 is locked in the neutral position.

Connector assembly 10 may be easier to use, easier to maintain, and safer than conventional means of connecting tubular segments. Because the tubular members may not need to be rotated to make up the connection, connector assembly 10 may be used with full robotics, with automated rigs, or for rigless intervention work.

Where first and second tubular members 12 and 14 are chiksans, connector nut 16 may be formed of a mild steel alloy. Where first and second tubular members 12 and 14 are water hose segments, connector nut 16 may be formed of a mild steel. Where first and second tubular members 12 and 14 are fire hose segments, connector nut 16 may be formed of brass. In each of these connections, the connector assembly may secure first and second tubular members 12 and 14 together without the need for torque to make up the connection. Instead, only a slight rotation is needed, along with securing a pin.

Where first and second tubular members 12 and 14 are plumbing line segments, connector nut 16 may be formed of a plastic material, such as PVC. In this embodiment, the connector assembly may secure first and second tubular members 12 and 14 without glue or the need to tighten the connection to the point of deforming the material of tubular members 12 and 14.

In other embodiments, the connector assembly may be used to replace other fittings, such as military tank barrels and rifle barrels.

While preferred embodiments of the present disclosure have been described, it is to be understood that the embodiments described are illustrative only and that the scope of the disclosure is to be defined solely by the appended claims when accorded a full range of equivalents, many variations and modifications naturally occurring to those skilled in the art from a perusal hereof.

What is claimed is:

1. A method of connecting two chiksans, comprising the steps of:
   a) providing a connector assembly, comprising: a first chiksan including an outer surface, an inner surface, and a recess in said outer surface, said inner surface forming a first bore, said first chiksan having a pin end with a first rotational torque transfer profile; a second chiksan including an outer surface and an inner surface, said inner surface forming a second bore, said second chiksan having a connector end adapted to receive said pin end of said first chiksan within said second bore, wherein said inner surface of said connector end includes a second rotational torque transfer profile dimensioned to engage said first rotational torque transfer profile; a connector nut capable of interconnecting said first chiksan with said second chiksan to achieve fluid communication between said first bore and said second bore, said connector nut including an outer surface, an inner surface, an upper section, a lower section, and a thru hole in said upper section, said lower section of said connector nut capable of being detachably affixed to said connector end of said second chiksan, said upper section of said connector nut capable of operatively retaining said pin end of said first chiksan; a holding device dimensioned to fit in said thru hole and said recess; and a plurality of seals capable of forming a pressure seal within said assembly;

b) stabbing said pin end of said first chiksan into said connector end of said second chiksan so that said first bore and said second bore are placed in fluid communication and said first rotational torque transfer profile operatively engages said second rotational torque transfer profile in order to transfer rotational torque from said first chiksan to said second chiksan;

c) detachably affixing said lower section of said connector nut to said connector end of said second chiksan;

d) causing said plurality of seals to operatively seal said assembly to prevent leaking of a pressurized fluid flowing through said first and second bores; and e) positioning said holding device in said thru hole of said connector nut and said recess of said first chiksan to maintain said connector nut in a fixed position relative to said first chiksan.

2. The method according to claim 1, wherein said inner surface of said lower section of said connector nut includes a first set of threads and said outer surface of said connector end of said second chiksan includes a second set of threads, and wherein in step (c) said lower section of said connector nut is threadedly affixed to said connector end of said second chiksan via mating engagement of said first set of threads with said second set of threads.

3. The method according to claim 2, wherein said first and second set of threads are each breech lock-type threads which are placed in mating engagement in step (c) by rotating said connector nut by a ½ turn, wherein the starting points of said breech lock-type threads of said first and second set of threads are staggered.

4. The method according to claim 1, wherein said inner surface of said lower section of said connector nut includes a first set of wicker-type threads and said outer surface of said connector end of said second chiksan includes a second set of wicker-type threads, and wherein in step (c) said lower section of said connector nut is snap locked to said connector end of said second chiksan via mating engagement of said first set of wicker-type threads with said second set of wicker-type threads.

5. The method according to claim 1, wherein said inner surface of said upper section of said connector nut includes a retaining shoulder and said outer surface of said pin end of said first chiksan includes a beveled shoulder, and wherein in step (e) said retaining shoulder is positioned to cooperatively engage with said beveled shoulder to operatively retain said pin end of said first chiksan.

6. The method according to claim 1, wherein said plurality of pressure seals are positioned on said outer surface of said pin end of said chiksan, and wherein in step (d) said plurality of seals form a pressure seal between said outer surface of said pin end of said first chiksan and said inner surface of said connector end of said second chiksan.

7. The method according to claim 1, wherein said holding device comprises an anti-rotation assembly having a stopper, and wherein step (e) comprises activating said anti-rotation assembly such that said stopper moves from a neutral position in which said stopper is disposed within said thru hole to an engaged position in which said stopper engages said recess of said first chiksan to maintain said connector nut in a fixed position relative to said first chiksan.

8. The method according to claim 7, wherein said anti-rotation assembly further comprises: a body disposed within said thru hole of said connector nut, said body comprising an inner wall having an outer bearing cavity and an inner bearing cavity, said body dimensioned to slidingly receive said stopper; a support member slidingly disposed within said body, a proximal end of said support member operatively connected to a distal end of said stopper, said support member comprising a guide; a plug disposed within said support member, said plug comprising a tapered outer surface extending from a proximal end to a distal neck, said distal neck dimensioned to fit through an aperture in said guide of said support member; a spring disposed within said support member, said spring interconnecting said proximal end of said plug and said distal end of said stopper; and a bearing disposed between said support member and said tapered outer surface of said plug, said bearing dimensioned to engage said outer bearing cavity and said inner bearing cavity; and wherein said activation of said anti-rotation assembly in step (e) further comprises:

i) inserting a tool through a distal opening of said body and a distal opening of said support member in order to engage said distal neck of said plug with said tool;

ii) applying pressure to said distal neck of said plug with said tool in order to displace said plug, compress said spring, and release said bearing from said outer bearing cavity;

iii) applying pressure to said guide with said tool in order to slide said support member and said stopper to engage said recess of said first chiksan with said stopper;

iv) withdrawing said tool from said guide and said distal neck in order to expand said spring and transfer said bearing into said inner bearing cavity with said tapered outer surface of said plug to secure said support member and said stopper in said engaged position.

* * * * *